(12) United States Patent
Freear et al.

(10) Patent No.: US 8,654,907 B2
(45) Date of Patent: Feb. 18, 2014

(54) DATA RECEIVER WITH IMPROVED RESPONSE TO LONG AND SHORT TERM FADING

(75) Inventors: Steven Freear, Shipley (GB); Paschalis Sofotasios, Shipley (GB)

(73) Assignee: Pace PLC, Saltaire, Shipley (GB)

( * ) Notice: Subject to any disclaimer, the term of this patent is extended or adjusted under 35 U.S.C. 154(b) by 173 days.

(21) Appl. No.: 13/070,587

(22) Filed: Mar. 24, 2011

(65) Prior Publication Data

US 2012/0014481 A1 Jan. 19, 2012

(30) Foreign Application Priority Data

Mar. 24, 2010 (GB) .................... 1004946.8

(51) Int. Cl.
*H03D 1/04* (2006.01)
*H04B 1/10* (2006.01)
*H04L 1/00* (2006.01)

(52) U.S. Cl.
USPC ............................ 375/346; 375/340

(58) Field of Classification Search
USPC .................. 375/316, 340, 341, 346
See application file for complete search history.

(56) References Cited

U.S. PATENT DOCUMENTS 7,280,942 B2 * 10/2007 Mehta et al. .................. 702/189

* cited by examiner

*Primary Examiner* — David B. Lugo
(74) *Attorney, Agent, or Firm* — Head, Johnson & Kachigian, P.C.

(57) ABSTRACT

The invention relates to apparatus for the receipt of digital data which is transmitted as a data signal from a remote location and a method by which the receiving apparatus can be designed with a configuration to improve the ability to receive the data signal. The design of the configuration is generated with reference to at least one decision metric which is adapted to suit the known characteristics of the data signal which is being received.

13 Claims, 4 Drawing Sheets

DATA RECEIVER WITH IMPROVED RESPONSE TO LONG AND SHORT TERM FADING

CROSS-REFERENCE TO RELATED APPLICATIONS

This application claims priority to United Kingdom Patent Application No. 1004946.8 filed Mar. 24, 2010 which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention to which this application relates is a broadcast data receiver apparatus which is provided in a form so as to have an improved response to long and short term fading of the data channels.

2. Prior Art

The demand for increased capacity in data receiving apparatus, and/or reduced information errors continues to grow and there is also an increasing demand for generally efficient operation of wireless communication systems. However, a fundamental constraint to the capacity of the data transmission and receiving system is one or both of the digital receiver and the propagation medium (i.e the channel on which the data is transmitted).

Broadcast signals which are transmitted are typically distorted by atmospheric and environmental impairments, thereby degrading the quality of the signal which is subsequently received. In general, one form of deterioration is fading which is typically caused by physical phenomena such as reflection, diffraction and scattering. According to the number of the scattering phenomena which may be present in a wireless channel, the effect of these phenomena is either rich or poor. This is the case in the occurrence of multipath and shadowing fading, respectively.

It is known from the theory of telecommunications that multipath fading and shadowing of propagated signals, (also known as short-term fading and long-term fading respectively), can be effectively described and represented by statistical distributions.

Conventionally used distributions such as those known as Rayleigh, Weibull and Nakagami -m, -n, -q distributions, are adequate when describing multipath fading. However, they are found not to be optimal and/or robust because they do not additionally consider the simultaneous occurrence of the shadowing effect.

Another known distribution known as the Suzuki statistical distribution has the advantage that it is a composite Rayleigh/Lognormal distribution. As a consequence, it is capable of describing at once both the multipath and the shadowing of communication signals which occur simultaneously during wireless propagation. However, the probability density function (PDF) of the Suzuki distribution is described by the integral of the synthesis of Lognormal and Rayleigh, distribution. An explicit solution to this integral is not known in the prior art and thus it has not been possible to implement a receiver for a digital data system which is operable over such a fading channel.

An existing method of compensating for shadowing is by providing the receiver with empirical data, i.e. actual data, relating to the geographical area in which the receiver is to be used. However, it, is time-consuming to produce such data, the data is not always specific enough to the receiver location, and if the receiver is moved to a new location, new empirical data has to be obtained.

An aim of the present invention is to provide a receiver which can characterise accurately the signal degradation caused by the presence of multipath fading and shadowing. Another aim is to provide a method whereby the characterisation of the signal degradation can be accurately determined.

BRIEF SUMMARY OF THE INVENTION

In one aspect of the invention, there is provided a broadcast receiver wherein the configuration of the apparatus and/or processing means used to receive the data signal is assessed with respect to a decision metric derived upon utilising the probability density function of a Suzuki distribution in a closed form:

$$p_{a_l}(a_l) = \left(\frac{5}{2}\right)^{\frac{1}{8\sigma^2}} \frac{a_l e^{-\frac{\mu^2}{2\sigma^2}}}{\sigma\sqrt{2\pi}} \Gamma\left(1 - \frac{1}{8\sigma^2} - \frac{\mu}{2\sigma^2}\right)\left(-\frac{1}{8\sigma^2} - \frac{a_l^2}{2}\right)^{-1+\frac{1}{8\sigma^2}+\frac{\mu}{2\sigma^2}}$$

where $\sigma$ and $\mu$ denote the variance and mean value respectively of the Lognormal distribution, in order to take into account potential impairment of the said data signal.

Thus the receiver can be optimised in a number of conditions such that the requirement for empirically modelling the channel before deploying a new network is removed. As such the receiver has improved performance over fading channels and is adaptive to the location of the receiver.

In one embodiment, where amplitudes are independent with first order probability density functions $\{p\alpha_l(\alpha_l)\}_{l=1}^{L_p}$, and the phase and delay values are known the decision metric to be used which is derived from the Suzuki distribution is:

$$\Lambda_k = \ln\left[p(\{r_l(t)\}_{l=1}^{L_p}|s_k(t),\{\theta_l\}_{l=1}^{L_p},\{\tau_l\}_{l=1}^{L_p})\right]$$

The decision metric below allows implementation of a receiver design in the case of known phases but unknown delays and amplitudes.

$$\Lambda_k = \ln\left[p(\{r_l(t)\}_{l=1}^{L_p}|s_k(t),\{\theta_l\}_{l=1}^{L_p})\right] =$$

From the theory of digital communications, the decision metric for the case of known delays and amplitudes but unknown phases is:

$$\Lambda_k = \ln\left[p(\{r_l(t)\}_{l=1}^{L_p} \mid s_k(t), \{\alpha_l\}_{l=1}^{L_p}, \{\tau_l\}_{l=1}^{L_p})\right]$$

$$= \kappa \sum_{i=1}^{L_p} \ln\left[e^{-\frac{a_l^2 E_k}{N_l}} I_o\left(\frac{a_l}{N_l}|y_{kl}(\tau_l)|\right)\right]$$

In one embodiment the decision metric derived from the case of known delays but unknown amplitudes and phases is:

$$\Lambda_k = \ln[p(\{r_l(t)\}_{l=1}^{L_p} | s_k(t), \{\tau_l\}_{l=1}^{L_p})]$$

This decision metric allows implementation of a receiver configuration design in the case of known delays but unknown phases and amplitudes.

In one embodiment the decision metric derived from the case of unknown delays, amplitudes and phases is:

$$\Lambda_k = \ln[p(\{r_l(t)\}_{l=1}^{L_p} | s_k(t)]=$$

This decision metric allows implementation of a receiver configuration design for the case of unknown delays, phases and amplitudes.

In one embodiment the design or configuration of the receiving apparatus include details of coherent detection as well as non-coherent detection.

In one embodiment the designs include details of the possible modulation schemes, typically M-PSK, M-QAM, ASK/PAM, FSK, MSK and OFDM.

In one embodiment the designs include a plurality of shaping pulses, typically square, sinusoidal and cosine.

In one embodiment the broadcast receiver characterises signal impairment optimally by utilising any, or any combination of, the decision metrics described herein.

Typically, according to the level of channel knowledge, the decision metric allows optimisation of the signal reception parameters or design.

In a further aspect of the invention there is provided a method of configuring receiving and/or processing apparatus for at least one data signal received from a remote transmitting location, said method including the steps of:

identifying the geographical location at which the said apparatus is to be used;

identifying the data signal which is to be received and wherein the said apparatus is further configured with reference to a decision metric derived upon utilising the probability density function of a Suzuki distribution in a closed form:

$$p_{a_l}(a_l) = \left(\frac{5}{2}\right)^{\frac{1}{8\sigma^2}} \frac{a_l e^{-\frac{\mu^2}{2\sigma^2}}}{\sigma\sqrt{2\pi}} \Gamma\left(1 - \frac{1}{8\sigma^2} - \frac{\mu}{2\sigma^2}\right)\left(-\frac{1}{8\sigma^2} - \frac{a_l^2}{2}\right)^{-1+\frac{1}{8\sigma^2}+\frac{\mu}{2\sigma^2}}$$

where σ and μ denote the variance and mean value respectively of the Lognormal distribution, in order to take into account potential impairment of the said data signal.

BRIEF DESCRIPTION OF THE SEVERAL VIEWS OF THE DRAWING(S)

Further details of specific embodiments are now described wherein:—

DETAILED DESCRIPTION OF THE INVENTION

Figure 1:
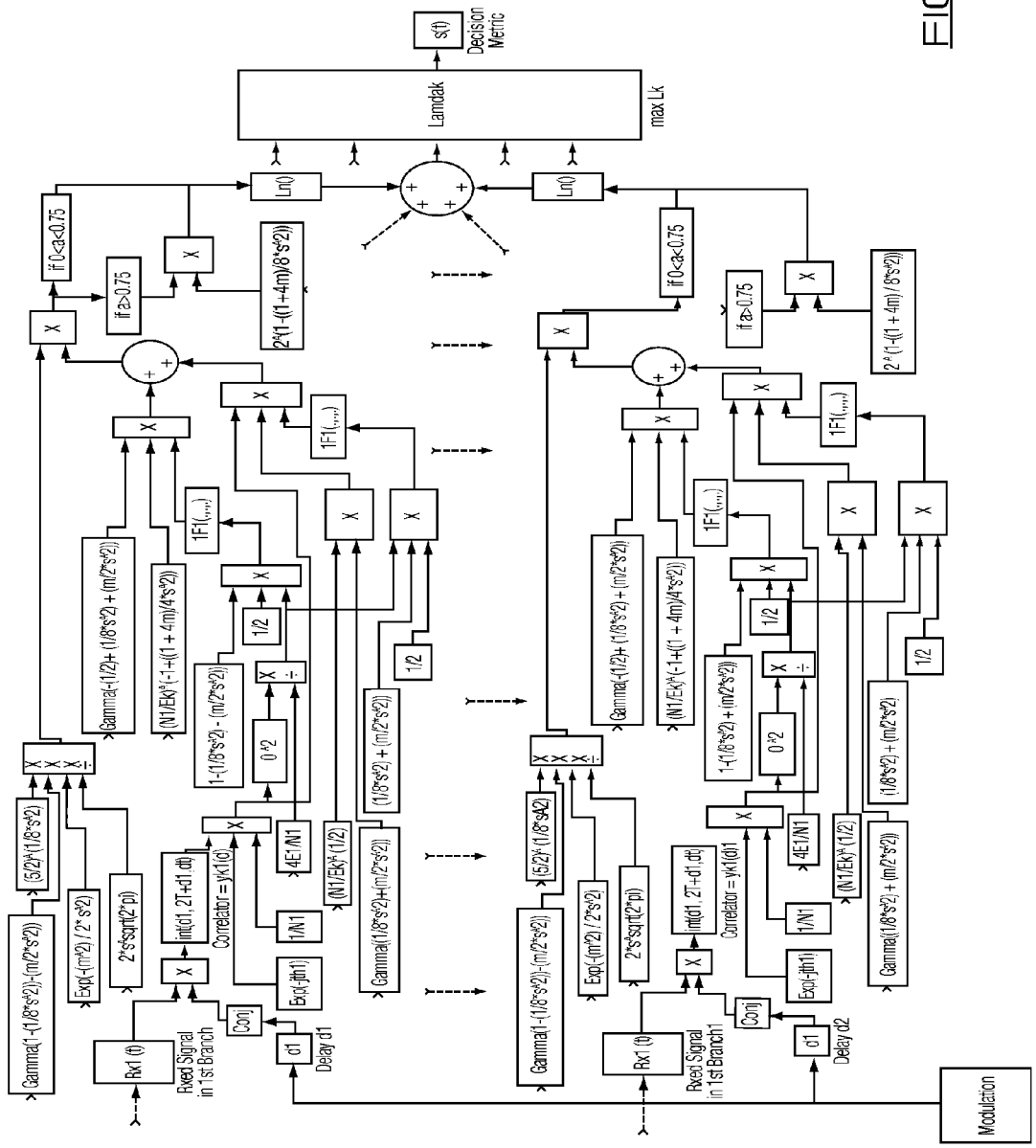
FIG. 1 illustrates a receiver apparatus configuration design for the case of known delay and phase values but unknown amplitude values for a data signal to be received.

In the transmission of a data signal to one or more receiver apparatus then during a symbol period of 'Ts' seconds of the data signal the transmitter transmits a real bandpass signal which can be represented as:

$$S_k(t) = Re\{\tilde{s}_k(t)\} = Re\{\tilde{S}_k(t)e^{j2\pi f_c t}\} \quad (1)$$

where $\tilde{s}_k$ is the $k_{th}$ complex bandpass signal and $\tilde{S}_k(t)$ is the corresponding $k_{th}$ complex baseband signal chosen from the set of M equi-probable message waveforms which represents the transmitted information.

The above signal (1) is transmitted over the fading channel which is characterized by $L_p$ independent diversity paths. Each of these paths is a time varying channel that attenuates, delays, phase-shifts the signal while it also adds an AWGN source. Thus, the received data signal at the receiving apparatus is in fact a set of "noisy" replicas of the transmitted signal.

It should be noted here that a so-called "one-shot" approach for the transmission of the data signal is assumed to be used herein i.e. a single transmission wherein ISI that would be produced by the presence of the path delays on continuous transmission is ignored. Hence, the received signal will be expressed as follows:

$$r_l(t) = Re\{\alpha_l \tilde{s}_k(t-\tau_l)e^{j\theta_l} + n_l(t)\} = Re\{\alpha_l \tilde{S}_k(t-\tau_l)e^{j(2\pi f_c t + \theta_l)} + N_l(t)e^{j2\pi f_c t}\} \quad (2)$$

$$\Rightarrow r_l(t) = Re\{\tilde{r}_l(t)\} = Re\{\tilde{R}_l(t)e^{j2\pi f_c t}\} \, l=1,2,3,\ldots,L_p \quad (3)$$

where $\{N_l(t)\}\text{hd } l=1^{L_p}$ is a set of statistically independent complex Additive White Gaussian Noise (AWGN) processes, each with PSD $2N_l$ Watts/Hertz.

The sets $\{a_l\}_{l=1}^{L_p}$, $\{\theta_l\}_{l=1}^{L_p}$ and $\{\tau_l\}_{l=1}^{L_p}$ are the random channel amplitudes, phases and delays respectively and they are assumed to be constant over one or two symbol periods i.e. $T_g$ and $2T_g$ for non-coherent and coherent detection respectively.

Another important assumption is that $\tau_1 < \tau_2 < \ldots < \tau_{L_p}$. The optimum receiver computes the set of a posteriori probabilities $p(s_k(t)|\{r_l(t)\}_{l=1}^{L_p})$, k=1, 2, ..., M and chooses as its decision that message whose signal $s_k(t)$ corresponds to the largest of these probabilities. In addition, the receiver is assumed to be time—synchronised to the transmitted signal.

Since the messages (signals) are assumed to be equi-probable, then, by Bayes' rule, the equivalent decision rule is to choose $s_k(t)$ corresponding to the largest of the conditional probabilities (likelihoods)

$$p(\{r_l(t)\}_{l=1}^{L_p} | s_k(t)), k=1,2;\ldots,M$$

which is the Maximum-Likelihood (ML) decision rule. By making use of the law of conditional probability, each of these conditional probabilities can be expressed by equation (4) as follows:

$$\iiint p(\{r_l(t)\}_{l=1}^{L_p} | s_k(t), \{\alpha_l\}_{l=1}^{L_p}, \{\theta_l\}_{l=1}^{L_p}, \{\tau_l\}_{l=1}^{L_p}) p(\{\alpha_l\}_{l=1}^{L_p}, \{\theta_l\}_{l=1}^{L_p}, \{\tau_l\}_{l=1}^{L_p}) d\{\alpha_l\}_{l=1}^{L_p} d\{\theta_l\}_{l=1}^{L_p} d\{\tau_l\}_{l=1}^{L_p}$$

which is dependent upon the degree of knowledge i.e. amount of Channel State Information (CSI) available on the parameter sets) $\{\alpha_l\}_{l=1}^{L_p}, \{\theta_l\}_{l=1}^{L_p}, \{\tau_l\}_{l=1}^{L_p}$.

In case that any of the three parameter sets are assumed to be known, then the statistical averages on that set of parameters need not be performed. Of course, in the case where all parameters are assumed to be known to the receiver, none of the statistical averages in (4) need be performed and as a consequence the ML decision rule simplifies to choosing the largest of:

$$p(\{r_l(t)\}_{l=1}^{L_p} | s_k(t), \{\alpha_l\}_{l=1}^{L_p}, \{\theta_l\}_{l=1}^{L_p}, \{\tau_l\}_{l=1}^{L_p}), k=1, 2, \ldots, M$$

Receivers that make use of CSI have been termed self-adaptive in that the estimates of the system parameters are utilized to adjust the decision structure, thereby, improving the system performance by adaptation to variation of the channel changes.

Example 1

Known Amplitudes, Phases and Delays; Non-Coherent Detection

Conditioned on perfect knowledge of the amplitudes, phases and delays, the conditional probability $p(\{r_l(t)\}_{l=1}^{L_p} | s_k(t), \{\alpha_l\}_{l=1}^{L_p}, \{\theta_l\}_{l=1}^{L_p}, \{\tau_l\}_{l=1}^{L_p})$ is a joint Gaussian Probability Density Function (PDF) that because of the independence assumption on the additive noise components can be written as:

$$p(\{r_l(t)\}_{l=1}^{L_p} | s_k(t), \{\alpha_l\}_{l=1}^{L_p}, \{\theta_l\}_{l=1}^{L_p}, \{\tau_l\}_{l=1}^{L_p}) = \qquad (5)$$

$$\prod_{l=1}^{L_p} K_1 e^{-\frac{1}{2N_i} \int_{\tau_l}^{T_s+\tau_l} |r_l(t) - \alpha_l \tilde{s}_k(t-\tau_l) e^{j\theta_l}|^2 dt} =$$

$$\prod_{l=1}^{L_p} K_1 e^{-\frac{1}{2N_i} \int_{\tau_l}^{T_s+\tau_l} |\tilde{R}_l(t) - \alpha_l \tilde{s}_k(t-\tau_l) e^{j\theta_l}|^2 dt}$$

where K is an integration constant. After simplification of equation (5) we obtain:

$$p(\{r_l(t)\}_{l=1}^{L_p} | s_k(t), \{\alpha_l\}_{l=1}^{L_p}, \{\theta_l\}_{l=1}^{L_p}, \{\tau_l\}_{l=1}^{L_p}) = \qquad (6)$$

$$K \prod_{l=1}^{L_p} e^{Re\left[\frac{\alpha_l}{N_i} e^{-j\theta_l} y_{kl}(\tau)\right] - \frac{\alpha_l^2 E_k}{N_i}} = K e^{\sum_{l=1}^{L_p} Re\left[\frac{\alpha_l}{N_i} e^{-j\theta_l} y_{kl}(\tau)\right] - \frac{\alpha_l^2 E_k}{N_i}}$$

where, $$y_{kl}(\tau) = \int_{\tau_l}^{T_s+\tau_l} \tilde{R}_l(t) \tilde{s}_k^*(t-\tau_l) dt = \int_0^{T_s} \tilde{R}_l(t+\tau_l) \tilde{s}_k^*(t) dt \qquad (7)$$

is the complex cross correlation of the $l_{th}$ received signal and the $k_{th}$, signal waveform and $$E_k = \frac{1}{2} \int_0^{T_s} |\tilde{s}_k(t)|^2 dt = \frac{1}{2} \int_{\tau_l}^{T_s+\tau_l} |\tilde{s}_k(t-\tau_l)|^2 dt \qquad (8)$$

is the energy of the $k_{th}$ signal $\tilde{s}s_k(t)$. Furthermore, the constant K absorbs all the $K_l$.s as well as the factor $$e^{\sum_{l=1}^{L_p} \frac{1}{2N_i} \int_0^{T_s} |R_l(t)|^2 dt}.$$

which is independent of K and thus has no bearing on the decision. Since, the natural logarithm is a monotonic function of its argument, we can equivalently maximize with respect to k and obtain (9) as follows:

$$\Lambda_k = \ln[p(\{r_l(t)\}_{l=1}^{L_p} | s_k(t), \{\alpha_l\}_{l=1}^{L_p}, \{\theta_l\}_{l=1}^{L_p}, \{\tau_l\}_{l=1}^{L_p})] \qquad (9)$$

$$= \sum_{l=1}^{L_p} Re\left[\frac{\alpha_l}{N_i} e^{-j\theta_l} y_{kl}(\tau)\right] - \frac{\alpha_l^2 E_k}{N_i} \qquad (10)$$

where K is ignored due to its independence with k.

Example 2

Known Phases and Delays, Unknown Amplitudes; Non-Coherent Detection

When the amplitudes of the received data signal are unknown, then the conditional probability of equation (6), must be averaged over their Joint Probability Density Function (JPDF) to arrive at the decision metric. Assuming independent amplitudes with first-order PDFs $\{p\alpha_l(\alpha_l)\}_{l=1}^{L_p}$ we obtain: equation (11) as follows:

$$p(\{r_l(t)\}_{l=1}^{L_p} | s_k(t), \{\theta_l\}_{l=1}^{L_p}, \{\tau_l\}_{l=1}^{L_p}) =$$

$$K \prod_{l=1}^{L_p} \int_0^\infty e^{Re\left[\frac{\alpha_l}{N_i} e^{-j\theta_l} y_{kl}(\tau)\right] - \frac{\alpha_l^2 E_k}{N_i}} p_{\alpha_l}(\alpha_l) d\alpha_l$$

According to the invention, the PDF of Suzuki distribution is expressed mathematically as:

$$p_{\alpha_l}(\alpha_l) = \qquad (12)$$

$$\left(\frac{5}{2}\right)^{\frac{1}{8\sigma^2}} \frac{a_l e^{-\frac{\mu^2}{2\sigma^2}}}{\sigma \sqrt{2n}} \Gamma\left(1 - \frac{1}{8\sigma^2} - \frac{\mu}{2\sigma^2}\right)\left(-\frac{1}{8\sigma^2} - \frac{a_l^2}{2}\right)^{-1+\frac{1}{8\sigma^2}+\frac{\mu}{2\sigma^2}}$$

where,
$\sigma$=the variance of Lognormal distribution
$\mu$=mean value of lognormal distribution Therefore, by inserting equation (12) into equation (11) we obtain analytically:

$$p(\{r_l(t)\}_{l=1}^{L_p} | s_k(t), \{\theta_l\}_{l=1}^{L_p}, \{\tau_l\}_{l=1}^{L_p}) = \qquad (13)$$

$$K \prod_{l=1}^{L_p} \int_0^\infty e^{Re\left[\frac{\alpha_l}{N_i} e^{-j\theta_l} y_{kl}(\tau)\right] - \frac{\alpha_l^2 E_k}{N_i}} \left(\frac{5}{2}\right)^{\frac{1}{8\sigma^2}} \frac{a_l e^{-\frac{\mu^2}{2\sigma^2}}}{\sigma \sqrt{2n}}$$

$$\Gamma\left(1 - \frac{1}{8\sigma^2} - \frac{\mu}{2\sigma^2}\right)\left(-\frac{1}{8\sigma^2} - \frac{a_l^2}{2}\right)^{-1+\frac{1}{8\sigma^2}+\frac{\mu}{2\sigma^2}} da_l$$

The integral in (13) can not be solved in closed-form as currently expressed, mainly due to the summation term under the power term. By assuming that $$\left(\frac{1}{8\sigma^2} + \frac{a_l^2}{2}\right) \approx a_l^2, 0 \leq \alpha_l < 1 \qquad (14)$$

and $$\left(\frac{1}{8\sigma^2} + \frac{a_l^2}{2}\right) \approx \frac{a_l^2}{2}, a_l \geq 1 \qquad (15)$$

Equation (13) can become respectively, $$p(\{r_l(t)\}_{l=1}^{L_p} | s_k(t), \{\theta_l\}_{l=1}^{L_p}, \{\tau_l\}_{l=1}^{L_p}) = \quad (16)$$

$$K \prod_{l=1}^{L_p} \int_0^\infty e^{Re\left[\frac{a_l}{N_l} e^{-j\theta_l} y_{kl}(\tau)\right] - \frac{a_l^2 E_k}{N_l}} \left(\frac{5}{2}\right)^{\frac{1}{8\sigma^2}}$$

$$\frac{a_l e^{-\frac{\mu^2}{2\sigma^2}}}{\sigma\sqrt{2n}} \Gamma\left(1 - \frac{1}{8\sigma^2} - \frac{\mu}{2\sigma^2}\right)(-a_l^2)^{-1+\frac{1}{8\sigma^2}+\frac{\mu}{2\sigma^2}} da_l$$

and $$p(\{r_l(t)\}_{l=1}^{L_p} | s_k(t), \{\theta_l\}_{l=1}^{L_p}, \{\tau_l\}_{l=1}^{L_p}) = \quad (17)$$

$$K \prod_{l=1}^{L_p} \int_0^\infty e^{Re\left[\frac{a_l}{N_l} e^{-j\theta_l} y_{kl}(\tau)\right] - \frac{a_l^2 E_k}{N_l}} \left(\frac{5}{2}\right)^{\frac{1}{8\sigma^2}}$$

$$\frac{a_l e^{-\frac{\mu^2}{2\sigma^2}}}{\sigma\sqrt{2n}} \Gamma\left(1 - \frac{1}{8\sigma^2} - \frac{\mu}{2\sigma^2}\right)\left(-\frac{a_l^2}{2}\right)^{-1+\frac{1}{8\sigma^2}+\frac{\mu}{2\sigma^2}} da_l$$

The closed-form solution of each of the above two equations are given below as follows $$p(\{r_l(t)\}_{l=1}^{L_p} | s_k(t), \{\theta_l\}_{l=1}^{L_p}, \{\tau_l\}_{l=1}^{L_p}) = \quad (18)$$

$$K \prod_{l=1}^{L_p} \left(\frac{5}{2}\right)^{\frac{1}{8\sigma^2}} \frac{e^{-\frac{\mu^2}{2\sigma^2}}}{2\sigma\sqrt{2n}} \Gamma\left(1 - \frac{1}{8\sigma^2} - \frac{\mu}{2\sigma^2}\right) \left[\frac{N_l}{E_k}\right]^{-1+\frac{1+4\mu}{4\sigma^2}} \Gamma\left(\frac{1+4\mu}{8\sigma^2} - \frac{1}{2}\right) *_1 F_1\left(\frac{1+4\mu}{8\sigma^2} - \frac{1}{2}, \frac{1}{2}, \frac{e^{-j2\theta_l} y_{kl}^2(T)}{4 E_k N_l}\right) + \left[\frac{e^{-j\theta_l} y_{kl}(T)}{N_l}\right]$$

$$\sqrt{\frac{N_l}{E_k}} \Gamma\left(\frac{1+4\mu}{8\sigma^2}\right)_1 F_1\left(\frac{1+4\mu}{8\sigma^2}, \frac{3}{2}, \frac{e^{-j2\theta_l} y_{kl}^2(T)}{4 E_k N_l}\right)$$

and $$p(\{r_l(t)\}_{l=1}^{L_p} | s_k(t), \{\theta_l\}_{l=1}^{L_p}, \{\tau_l\}_{l=1}^{L_p}) = \quad (19)$$

$$K \prod_{l=1}^{L_p} \left(\frac{5}{2}\right)^{\frac{1}{8\sigma^2}} \frac{e^{-\frac{\mu^2}{2\sigma^2}}}{2\sigma\sqrt{2n}} \Gamma\left(1 - \frac{1}{8\sigma^2} - \frac{\mu}{2\sigma^2}\right) \left[\frac{N_l}{E_k}\right]^{-1+\frac{1+4\mu}{4\sigma^2}}$$

$$\Gamma\left(\frac{1+4\mu}{8\sigma^2} - \frac{1}{2}\right) * 2^{1-\frac{1}{8\sigma^2} - \frac{\mu}{2\sigma^2}}_1$$

$$F_1\left(\frac{1+4\mu}{8\sigma^2} - \frac{1}{2}, \frac{1}{2}, \frac{e^{-j2\theta_l} y_{kl}^2(T)}{4 E_k N_l}\right) + \left[\frac{e^{-j\theta_l} y_{kl}(T)}{N_l}\right]$$

$$\sqrt{\frac{N_l}{E_k}} \Gamma\left(\frac{1+4\mu}{8\sigma^2}\right)_1 F_1\left(\frac{1+4\mu}{8\sigma^2}, \frac{3}{2}, \frac{e^{-j2\theta_l} y_{kl}^2(T)}{4 E_k N_l}\right)$$

Having managed to obtain (13) in a closed-form, the natural logarithm of it is taken in order to derive the decision metric of a receiver that has knowledge of the delays and phases of a Suzuki fading channel but not amplitudes. Therefore, one obtains:

$$\Lambda_k = \ln\left[p(\{r_l(t)\}_{l=1}^{L_p} | s_k(t), \{\theta_l\}_{l=1}^{L_p}, \{\tau_l\}_{l=1}^{L_p})\right] \quad (20)$$

Based on that decision metric the receiver apparatus configuration design illustrated in FIG. 1 can be implemented for the case of known delay and phase values but unknown amplitude values for the data signal to be received. This design contains a block that theoretically includes the modulation schemes that can be possibly used. It also contains three different shaping pulses. Furthermore, non-coherent detection as well as uniform PDF are assumed.

Example 3

Known Data Signal Phase Value, Unknown Data Signal Delay and Amplitude Values; Non-Coherent Detection After deriving successfully the decision metric for the case of known phases and delays but unknown amplitudes, we can derive next the decision metric for the case of known phases but unknown delays and amplitudes. However, it should be mentioned here that in typical practical applications, the fact that the phases are known while the delays are unknown is considered unorthodox. However, in quite narrowband systems (like OFDM) recent developments can make the realisation of such schemes possible. This can actually happen by determining the delays by the phase difference. Therefore, this design will be implemented since such case may attract more attention in future applications.

It is obvious that the difference between the current and the previous scheme is the lack of knowledge of the path delays. Hence, one has to average over the statistics of both amplitude and time, i.e, $p_{\alpha_l}(\alpha_l)$ and $p_{\tau_l}(\tau_l)$.

The former is expressed by equation (12) while the latter is expressed by Alouini—initially Charash—as:

$$p_{\tau_l}(\tau_l) = \frac{1}{B-A}, A < \tau_l < B \quad (21)$$

$$p(\{r_l(t)\}_{l=1}^{L_p} | s_k(t), \{\theta_l\}_{l=1}^{L_p}) =$$

$$K \prod_{l=1}^{L_p} \int_A^B \int_0^\infty e^{Re\left[\frac{a_l}{N_l} e^{-j\theta_l} y_{kl}(\tau)\right] - \frac{a_l^2 E_k}{N_l}} p_{\alpha_l}(\alpha_l) p_{\tau_l}(\tau_l) d\alpha_l d\tau_l =$$

Thus, the decision metric is expressed mathematically as follows:

$$p(\{r_l(t)\}_{l=1}^{L_p} | s_k(t), \{\theta_l\}_{l=1}^{L_p}) = \quad (22)$$

$$K \prod_{l=1}^{L_p} \int_A^B p(\{r_l(t)\}_{l=1}^{L_p} | s_k(t), \{\theta_l\}_{l=1}^{L_p}, \{\tau_l\}_{l=1}^{L_p}) d\tau_l$$

$$\Lambda_k = \ln\left[p(\{r_l(t)\}_{l=1}^{L_p} | s_k(t), \{\theta_l\}_{l=1}^{L_p})\right] =$$

$$\ln\left[K \prod_{l=1}^{L_p} \int_A^B p(\{r_l(t)\}_{l=1}^{L_p} | s_k(t), \{\theta_l\}_{l=1}^{L_p}, \{\tau_l\}_{l=1}^{L_p}) d\tau_l\right]$$

where the term $$\frac{1}{B-A}$$

from $p_{\tau_l}(\tau_l)$ is absorbed within the constant 'K'.

Therefore, it is straightforward to obtain the closed form expression for the decision metric:

$$\Lambda_k = \ln[p(\{r_l(t)\}_{l=1}^{L_p} | s_k(t), \{\theta_l\}_{l=1}^{L_p})] \quad (23)$$

$$= \ln\left( K(B-A)\prod_{l=1}^{L_p} \left(\frac{5}{2}\right)^{\frac{1}{8\sigma^2}} \frac{e^{-\frac{\mu^2}{2\sigma^2}}}{2\sigma\sqrt{2n}} \Gamma\left(1 - \frac{1}{8\sigma^2} - \frac{\mu}{2\sigma^2}\right) \left[\frac{N_l}{E_k}\right]^{-1+\frac{1+4\mu}{4\sigma^2}} \Gamma\left(\frac{1+4\mu}{8\sigma^2} - \frac{1}{2}\right) \right.$$

$$\left. {}_1F_1\left(\frac{1+4\mu}{8\sigma^2} - \frac{1}{2}, \frac{1}{2}, \frac{e^{-j2\theta_l} y_{kl}^2(T)}{4E_k N_l}\right) + \right.$$

$$\left. \left[\frac{e^{-j\theta_l} y_{kl}(T)}{N_l}\right]\sqrt{\frac{N_l}{E_k}} \Gamma\left(\frac{1+4\mu}{8\sigma^2}\right)_1 F_1\left(\frac{1+4\mu}{8\sigma^2}, \frac{3}{2}, \frac{e^{-j2\theta_l} y_{kl}^2(T)}{4E_k N_l}\right) \right)$$

and $$\Lambda_k = \ln[p(\{r_l(t)\}_{l=1}^{L_p} | s_k(t), \{\theta_l\}_{l=1}^{L_p})] \quad (24)$$

$$= \ln\left( K(B-A)\prod_{l=1}^{L_p} \left(\frac{5}{2}\right)^{\frac{1}{8\sigma^2}} \frac{e^{-\frac{\mu^2}{2\sigma^2}}}{2\sigma\sqrt{2n}} \Gamma\left(1 - \frac{1}{8\sigma^2} - \frac{\mu}{2\sigma^2}\right)\left[\frac{N_l}{E_k}\right]^{-1+\frac{1+4\mu}{4\sigma^2}} \Gamma\left(\frac{1+4\mu}{8\sigma^2} - \frac{1}{2}\right) * \right.$$

$$2^{1-\frac{1}{8\sigma^2} - \frac{\mu}{2\sigma^2}}$$

$$\left. {}_1F_1\left(\frac{1+4\mu}{8\sigma^2} - \frac{1}{2}, \frac{1}{2}, \frac{e^{-j2\theta_l} y_{kl}^2(T)}{4E_k N_l}\right) + \right.$$

$$\left. \left[\frac{e^{-j\theta_l} y_{kl}(T)}{N_l}\right]\sqrt{\frac{N_l}{E_k}} \Gamma\left(\frac{1+4\mu}{8\sigma^2}\right)_1 F_1\left(\frac{1+4\mu}{8\sigma^2}, \frac{3}{2}, \frac{e^{-j2\theta_l} y_{kl}^2(T)}{4E_k N_l}\right) \right)$$

Figure 2:
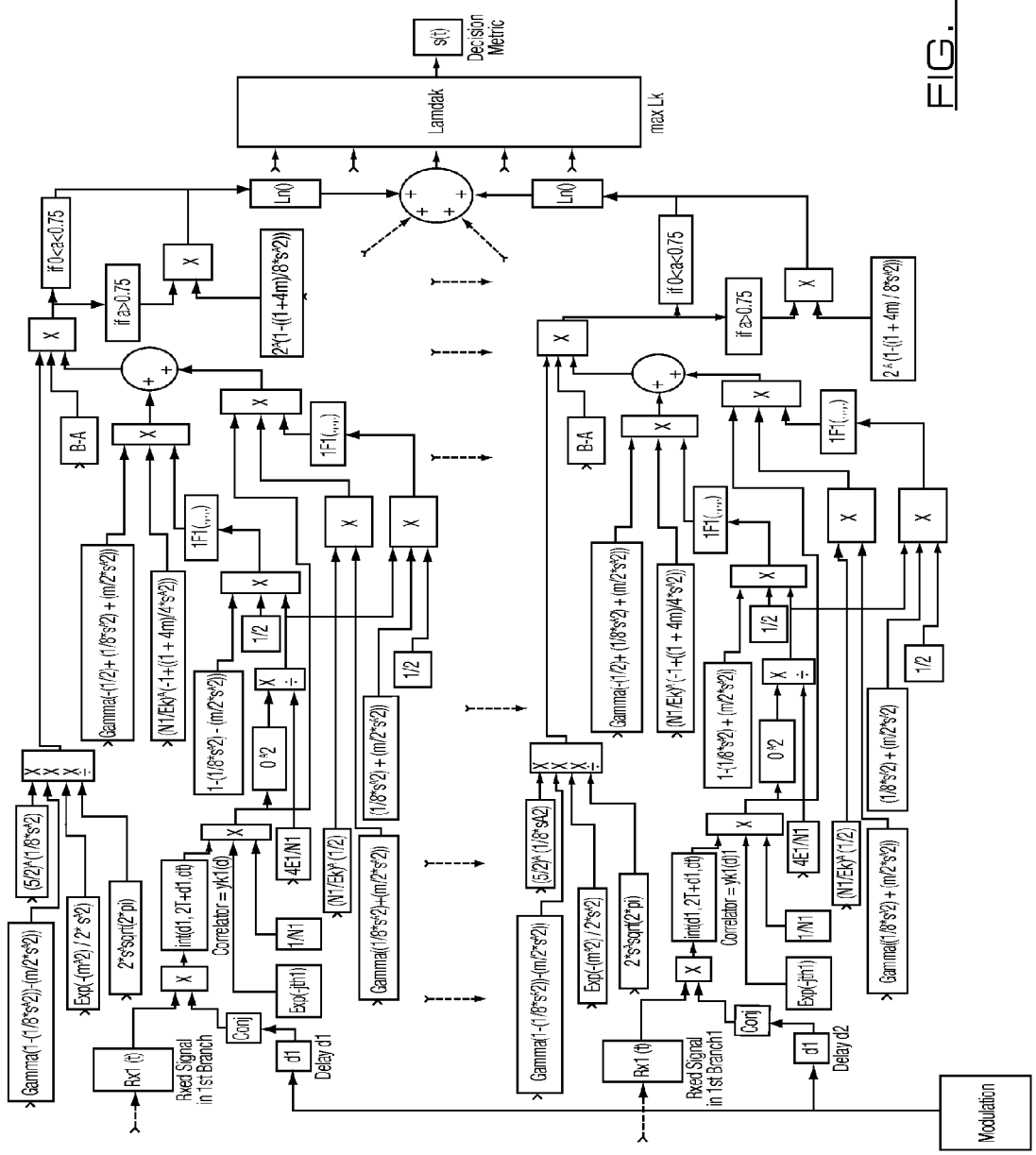
FIG. 2 illustrates a receiver apparatus configuration design for the case of known phase value but unknown delay and amplitude values for a received data signal.

Based on the decision metric expressed by equations (23) and (24), the receiver design illustrated in FIG. 2 can be implemented for the case of known phases but unknown delays and amplitudes. As in the above case, this design contains a block that theoretically includes the modulation schemes that can be possibly used together with the shaping pulses. Furthermore, non-coherent detection as well as uniform power decay profile (PDP) have been assumed.

Example 4

Known Delay and Amplitude Values, Unknown Phase Value; Non-Coherent Detection In the case of known delay and amplitude values but unknown phase value the scheme is independent of the novel expression for the PDF of Suzuki distribution. However, the analysis of this scheme is vital since the derived results are used in the derivation process of any scheme that the phases are considered unknown.

When the phases are unknown, then the conditional probability $p(\{r_l(t)\}_{l=1}^{L_p} | s_k(t), \{\alpha_l\}_{l=1}^{L_p}, \{\tau_l\}_{l=1}^{L_p})$ has to be averaged over their joint probability density function (JPDF) in order to arrive at the decision metric. Assuming independent phases with PDFs over the interval $\{0, 2\pi\}$, one obtains:

$$p(\{r_l(t)\}_{l=1}^{L_p} | s_k(t), \{\alpha_l\}_{l=1}^{L_p}, \{\tau_l\}_{l=1}^{L_p}) = \quad (25)$$

$$K\prod_{l=1}^{L_p} \int_0^{2\pi} e^{Re\left[\frac{a_l}{N_l} e^{-j\theta_l} y_{kl}(\tau)\right] - \frac{a_l^2 E_k}{N_l}} p_{\theta_l}(\theta_l) d\theta_l =$$

$$= K\prod_{l=1}^{L_p} e^{-\frac{a_l^2 E_k}{N_l}} \frac{1}{2\pi} \int_0^{2\pi} e^{Re\left[\frac{a_l}{N_l} e^{-j\theta_l} y_{kl}(\tau)\right]} d\theta_l = \quad (26)$$

-continued $$= K\prod_{l=1}^{L_p} e^{-\frac{a_l^2 E_k}{N_l}} \frac{1}{2n} \int_0^{2\pi} e^{Re\left[\frac{a_l}{N_l} y_{kl}(T)|\cos(\theta_l - \arg(y_{kl}(T))|\right]} d\theta_l \Rightarrow \quad (27)$$

$$p(\{r_l(t)\}_{l=1}^{L_p} | s_k(t), \{\alpha_l\}_{l=1}^{L_p}, \{\tau_l\}_{l=1}^{L_p}) = K\prod_{l=1}^{L_p} e^{-\frac{a_l^2 E_k}{N_l}} I_o\left(\frac{a_l}{N_l} | y_{kl}(\tau_l)|\right) \Rightarrow \quad (28)$$

$$\Lambda_k = \ln[p(\{r_l(t)\}_{l=1}^{L_p} | s_k(t), \{\alpha_l\}_{l=1}^{L_p}, \{\tau_l\}_{l=1}^{L_p})] = \quad (29)$$

$$K\prod_{l=1}^{L_p} \ln\left[e^{-\frac{a_l^2 E_k}{N_l}} I_o\left(\frac{a_l}{N_l} | y_{kl}(\tau_l)|\right)\right]$$

Example 5

Known Delay Values Unknown Phase and Amplitude Values for a Received Data Signal; Non-Coherent Detection The case of known delay values but unknown phase and amplitude values is perhaps the most critical design to be considered for wireless communication engineering applications and the appropriate configuration of the receiving apparatus for the data signals, and can be derived from the closed form solution for the decision metric Of the case of known delays and amplitude values but unknown phase values.

The equation (28) is averaged over the PDF of Suzuki distribution $p_{\alpha l}(\alpha_l)$. In other words, the mathematical expression of the decision metric of this scheme is the following:

$$p(\{r_l(t)\}_{l=1}^{L_p} \mid s_k(t), \{\tau_l\}_{l=1}^{L_p}) = \quad (30)$$

$$K \prod_{l=1}^{L_p} \int_0^\infty \int_0^{2\pi} e^{Re\left[\frac{a_l}{N_l} e^{-j\theta_l} y_{kl}(\tau)\right] - \frac{a_l^2 E_k}{N_l}} p_{\theta_l}(\theta_l) p_{\alpha_l}(\alpha_l) d\theta_l d\alpha_l =$$

$$p(\{r_l(t)\}_{l=1}^{L_p} \mid s_k(t), \{\tau_l\}_{l=1}^{L_p}) = \quad (31)$$

$$K \prod_{l=1}^{L_p} \int_0^\infty p\left(\begin{array}{c}\{r_l(t)\}_{l=1}^{L_p} \mid s_k(t),\\ \{\alpha_l\}_{l=1}^{L_p}, \{\tau_l\}_{l=1}^{L_p}\end{array}\right) p_{\alpha_l}(\alpha_l) d\alpha_l =$$

$$p(\{r_l(t)\}_{l=1}^{L_p} \mid s_k(t), \{\tau_l\}_{l=1}^{L_p}) = \quad (32)$$

$$K \prod_{l=1}^{L_p} \int_0^\infty e^{-\frac{a_l^2 E_k}{N_l}} I_o\left(\frac{a_l}{N_l} \mid y_{kl}(\tau_l)\mid\right) p_{\alpha_l}(\alpha_l) d\alpha_l =$$

and by inserting the equation (12) into equation (32) we obtain (33) as follows:

$$p(\{r_l(t)\}_{l=1}^{L_p} \mid s_k(t), \{\tau_l\}_{l=1}^{L_p}) = \quad (33)$$

$$K \prod_{l=1}^{L_p} \int_0^\infty e^{-\frac{a_l^2 E_k}{N_l}} I_o\left(\frac{a_l}{N_l} \mid y_{kl}(\tau_l)\mid\right) \left(\frac{5}{2}\right)^{\frac{1}{8\sigma^2}} \frac{a_l e^{-\frac{\mu^2}{2\sigma^2}}}{\sigma\sqrt{2n}}$$

$$\Gamma\left(1 - \frac{1}{8\sigma^2} - \frac{\mu}{2\sigma^2}\right)\left(-\frac{1}{8\sigma^2} - \frac{a_l^2}{2}\right)^{-1 + \frac{1}{8\sigma^2} + \frac{\mu}{2\sigma^2}} d a_l$$

Equation (33) cannot be solved in closed-form as currently expressed. The additional factor of complexity in this case is the modified Bessel function.

In order to simplify the summation term under the power term of Suzuki PDF, two assumptions were made based on the value of $\alpha_1$. The range of values of each of these two assumptions quite coincide with the range of values of the asymptotes of the modified Bessel function. In more detail, the modified Bessel function can be also expressed as:

$$I_b(x) = \begin{cases} \frac{1}{\Gamma(\beta+1)}\left(\frac{x}{2}\right)^b, & 0 < x \ll \sqrt{b+1} \\ \frac{1}{\sqrt{2\pi x}} e^x, & x \gg \left|b^2 - \frac{1}{4}\right| \end{cases} \quad (34)$$

Therefore, by taking into consideration equation (34) as well as the assumptions in (14) and (15), we obtain respectively, $$p(\{r_l^{(t)}\}_{l=1}^{L_p} \mid s_k(t), \{\tau_l\}_{l=1}^{L_p}) = \quad (35)$$

$$K \prod_{l=1}^{L_p} \int_0^\infty e^{-\frac{a_l^2 E_k}{N_l}} \left(\frac{5}{2}\right)^{\frac{1}{8\sigma^2}} \frac{a_l e^{-\frac{\mu^2}{2\sigma^2}}}{\sigma\sqrt{2\pi}} \Gamma\left(1 - \frac{1}{8\sigma^2} - \frac{\mu}{2\sigma^2}\right)$$

$$(a_l^2)^{-1 + \frac{1}{8\sigma^2} + \frac{\mu}{2\sigma^2}} d\alpha_l =$$

and $$K \prod_{l=1}^{L_p} \int_0^\infty e^{-\frac{a_l^2 E_k}{N_l}} \left(\frac{5}{2}\right)^{\frac{1}{8\sigma^2}} \frac{a_l e^{-\frac{\mu^2}{2\sigma^2}}}{\sigma\sqrt{2\pi}}$$

$$\frac{e^{\frac{a_l}{N_l}\mid y_{kl}(\tau_l)\mid}}{\sqrt{2\pi \frac{a_l}{N_l}\mid y_{kl}(\tau_l)\mid}} \Gamma\left(1 - \frac{1}{8\sigma^2} - \frac{\mu}{2\sigma^2}\right)\left(\frac{a_l^2}{2}\right)^{-1 + \frac{1}{8\sigma^2} + \frac{\mu}{2\sigma^2}} d\alpha_l$$

which has the following closed-form solutions, i.e.

$$p(\{r_l(t)\}_{l=1}^{L_p} \mid s_k(t), \{\tau_l\}_{l=1}^{L_p}) = \quad (36)$$

$$K \prod_{l=1}^{L_p} \left(\frac{5}{2}\right)^{\frac{1}{8\sigma^2}} \frac{e^{-\frac{\mu^2}{2\sigma^2}}}{\sigma\sqrt{2\pi}} \Gamma\left(1 - \frac{1}{8\sigma^2} - \frac{\mu}{2\sigma^2}\right) \frac{1}{2}\left[\frac{E_k}{N_l}\right]^{-\frac{1+4\mu}{8\sigma^2}} \Gamma\left(\frac{1+4\mu}{8\sigma^2}\right)$$

and $$K \prod_{l=1}^{L_p} \left(\frac{5}{2}\right)^{\frac{1}{8\sigma^2}} \frac{e^{-\frac{\mu^2}{2\sigma^2}}}{4\sigma\pi\sqrt{2}} \Gamma\left(1 - \frac{1}{8\sigma^2} - \frac{\mu}{2\sigma^2}\right) \left[\frac{E_k}{N_l}\right]^{\frac{1}{4} - \frac{1+4\mu}{8\sigma^2}} 2^{\frac{1}{2} - \frac{1}{8\sigma^2} - \frac{\mu}{2\sigma^2}}$$

$$\sqrt{\frac{\mid y_{kl}(\tau_l)\mid}{N_l}} \left(\Gamma\left(\frac{1+4\mu}{8\sigma^2} - \frac{1}{4}\right) {}_1F_1\left(\frac{1+4\mu}{8\sigma^2} - \frac{1}{4}, \frac{1}{2}, \frac{y_{kl}^2(\tau)}{4E_k N_l}\right)\right) - \left[\right.$$

$$\left.\frac{y_{kl}(\tau)}{\sqrt{E_k N_l}}\right] \Gamma\left(\frac{1+4\mu}{8\sigma^2} + \frac{1}{4}\right) {}_1F_1\left(\frac{1+4\mu}{8\sigma^2} + \frac{1}{4}, \frac{3}{2}, \frac{y_{kl}^2(\tau)}{4E_k N_l}\right)\right)$$

and by taking the natural logarithm of (36) we obtain the decision metric for the case of known delays but unknown amplitudes and phases as follows:

$$\Lambda_k = \ln\left[p(\{r_l(t)\}_{l=1}^{L_p} \mid s_k(t), \{\tau_l\}_{l=1}^{L_p})\right] \quad (37)$$

Figure 3:
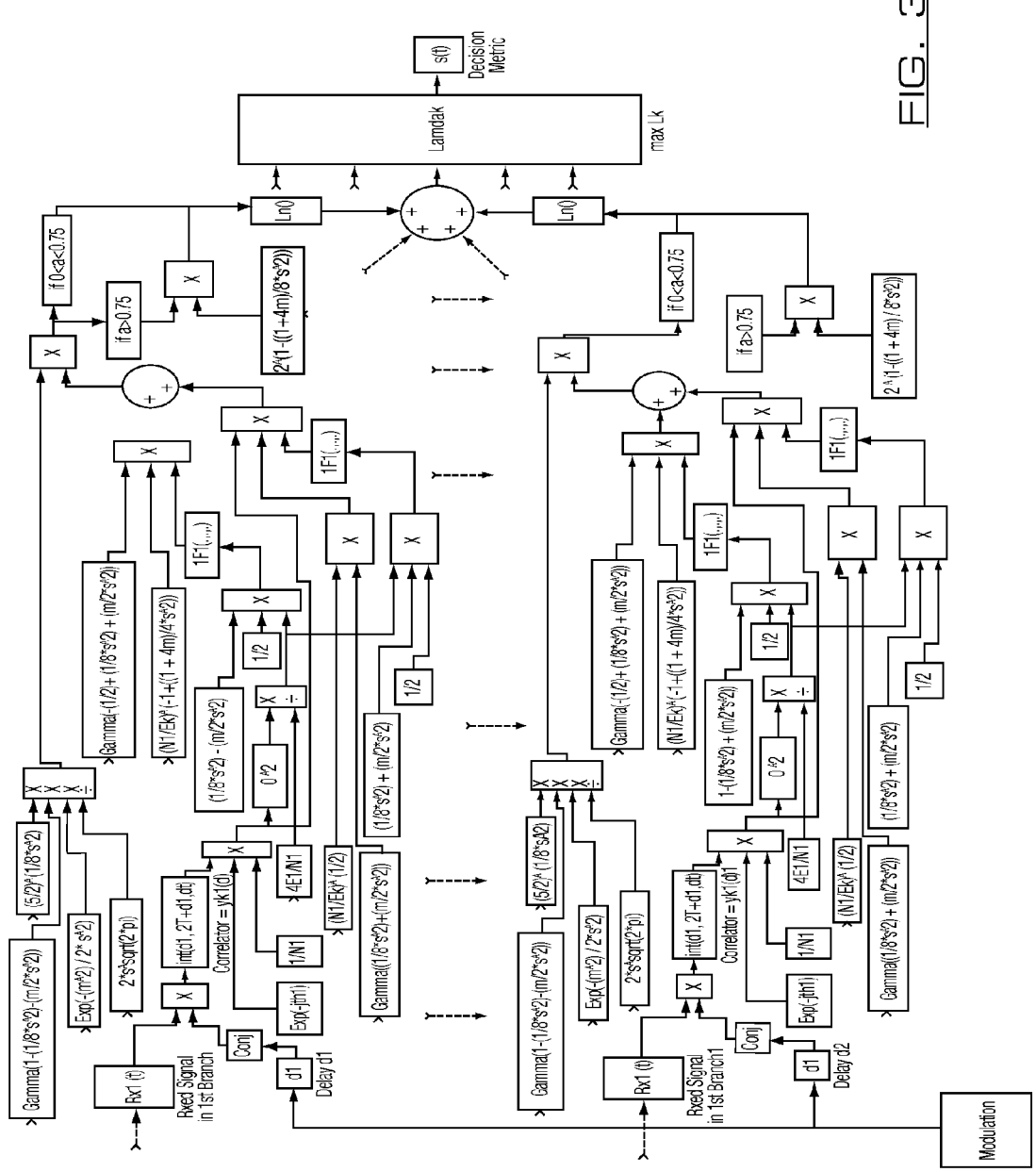
FIG. 3 illustrates a receiver apparatus configuration design for the case of a known delay value but unknown phase and amplitude values of a received data signal.

Based on that decision metric the receiver design illustrated in FIG. 3 can be implemented for the case of known delays but unknown phases and amplitudes. As in the above case, this design contains a block that theoretically includes the modulation schemes that can be possibly used together with shaping pulses. Furthermore, coherent detection as well as uniform PDP have been selected in this design.

Example 6

Unknown Phase, Delay and Amplitude Values for a Received Data Signal; Non-Coherent Detection When all channel parameters are unknown, the conditional probability has to be averaged over the statistics of the amplitudes, phases and delays which all are assumed statistically independent. However, since the decision metric has been derived for the case of known delays but unknown amplitudes and phases, we only need to average this metric over the PDF of time. The same methodology was followed above in the case of known phases but unknown amplitudes and delays. Therefore, the following expression must be solved in closed-form:

$$p(\{r_l(t)\}_{l=1}^{L_p} \mid s_k(t)) = \int_A^B p(\{r_l(t)\}_{l=1}^{L_p} \mid s_k(t), \{\tau_l\}_{l=1}^{L_p}) p_{\tau l}(\tau l) d\tau l \Rightarrow \quad (38)$$

$$p(\{r_l(t)\}_{l=1}^{L_p} \mid s_k(t)) = p(\{r_l(t)\}_{l=1}^{L_p} \mid s_k(t), \{\tau_l\}_{l=1}^{L_p}) \int_A^B p_{\tau l}(\tau l) d\tau l \Rightarrow \quad (39)$$

$$\Lambda_k = \ln[p(\{r_l(t)\}_{l=1}^{L_p} \mid s_k(t))] = \ln\left[K(B-A)\prod_{l=1}^{L_p} \left(\frac{5}{2}\right)^{\frac{1}{8\sigma^2}} \frac{e^{-\frac{\mu^2}{2\sigma^2}}}{\sigma\sqrt{2\pi}} \Gamma\left(1 - \frac{1}{8\sigma^2} - \frac{\mu}{2\sigma^2}\right)\right] \frac{1}{2}\left[\frac{E_k}{N_l}\right]^{-\frac{1+4\mu}{8\sigma^2}} \Gamma\left(\frac{1+4\mu}{8\sigma^2}\right) \quad (40)$$

and $$\ln\left[ K(B-A)\prod_{l=1}^{L_p} \left(\frac{5}{2}\right)^{\frac{1}{8\sigma^2}} \frac{e^{-\frac{\mu^2}{2\sigma^2}}}{4\sigma\pi\sqrt{2}} \Gamma\left(1 - \frac{1}{8\sigma^2} - \frac{\mu}{2\sigma^2}\right) \left[\frac{E_k}{N_l}\right]^{\frac{1}{4} - \frac{1+4\mu}{8\sigma^2}} 2^{\frac{1}{2} - \frac{1}{8\sigma^2} - \frac{\mu}{2\sigma^2}} \sqrt{\frac{|y_{kl}(\tau_l)|}{N_l}} \right.$$
$$\left. \left[ \Gamma\left(\frac{1+4\mu}{8\sigma^2} - \frac{1}{4}\right) {}_1F_1\left(\frac{1+4\mu}{8\sigma^2} - \frac{1}{4}, \frac{1}{2}, \frac{y_{kl}^2(\tau)}{4E_k N_l}\right) - \left[\frac{y_{kl}(\tau)}{\sqrt{E_k N_l}}\right] \Gamma\left(\frac{1+4\mu}{8\sigma^2} + \frac{1}{4}\right) {}_1F_1\left(\frac{1+4\mu}{8\sigma^2} + \frac{1}{4}, \frac{3}{2}, \frac{y_{kl}^2(\tau)}{4E_k N_l}\right) \right] \right].$$

Figure 4:
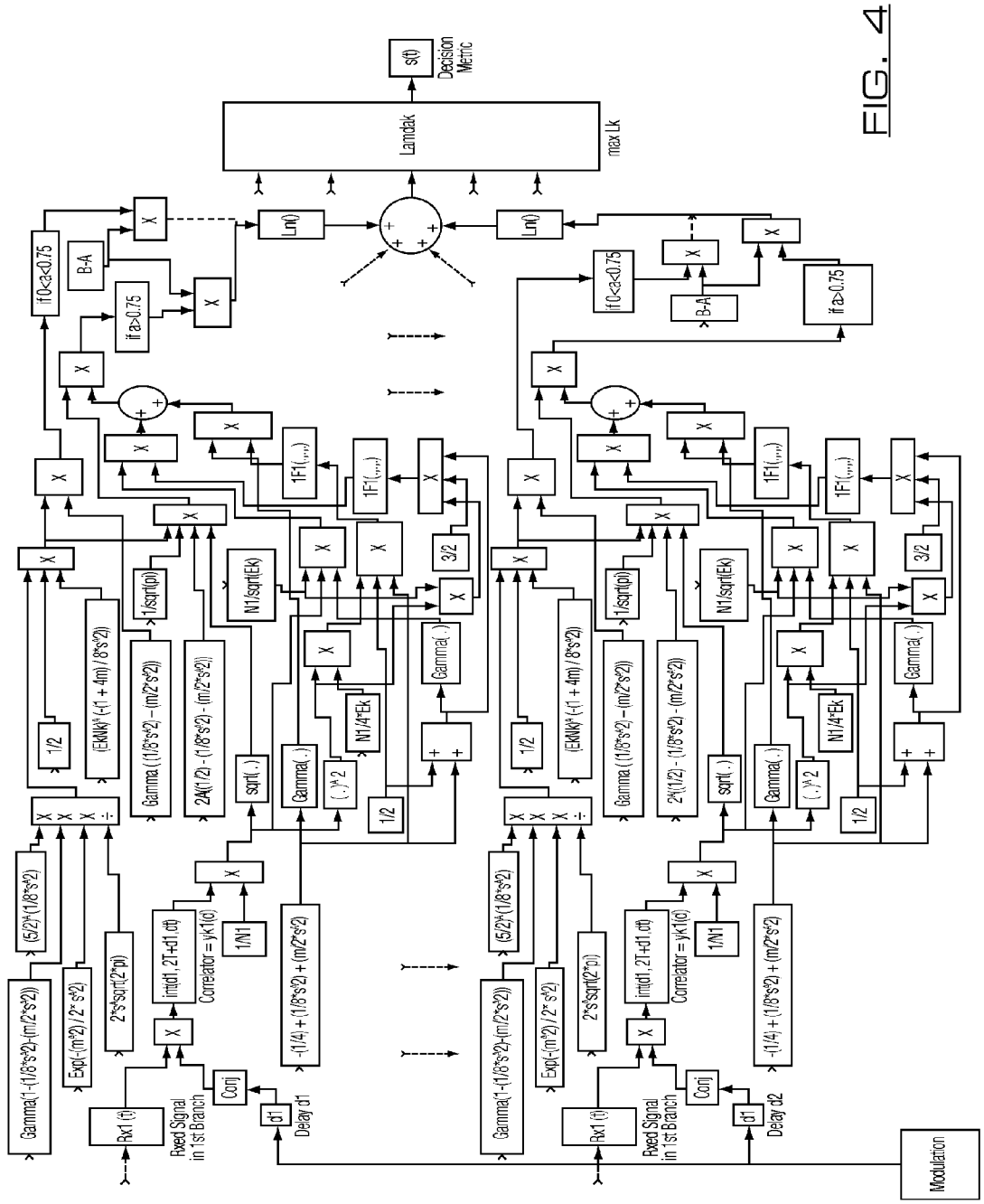
FIG. 4 illustrates a receiver apparatus configuration design for receipt of a data signal for which the delay, phase and amplitude values are unknown.

Based on this decision metric we can implement the receiver design as illustrated in FIG. 4 for the case of unknown delays, phases and amplitudes. As in the above case, this design contains a block that theoretically includes the modulation schemes that can be possibly used together with the shaping pulses. Furthermore, coherent detection as well as uniform PDP have been selected in this design.

Power Decay Profile

The Power Decay Profile (PDP) critically affects the performance of wireless communications systems and it is always considered as a factor of significant importance during the system design process. In the majority of systems, the PDP is typically considered to be flat i.e., $\Omega_l = \Omega$; l=1, 2, . . . , $L_p$. The PDP is considered to be of the same nature in all diversity paths between transmitter and receiver.

Uniform PDP indicates the uniform rate of variation of the power of the signal while Exponential PDP indicates its exponential variation. The PDP is described mathematically as follows:

$$\gamma_l = \gamma_1 e^{-\delta(l-1)}, l=1,2,\ldots,L_p \quad (41)$$

where $\gamma_l$ is the signal-to-noise ratio in the lth diversity path—

$$(SNR_l) = \frac{E_k}{N_l}.$$

and δ is the fading power decay profile factor which typically takes values between zero and two.

In the present case we will consider the values δ=0, 0.1, 0.5, 1.0, 2.0, while it is obvious that for δ=0, the exponential PDP becomes uniform PDP.

In addition, the nature of the PDP determines the degree of optimisation of a receiver design. For uniform PDP, the receiver design is considered optimum, while, for non-uniform PDP (exponential in our case), the receiver design is considered suboptimum.

Coherent Detection

Hereinabove it is assumed that the channel is constant for one symbol period i.e. the detection is considered non-coherent. However, it is well known that coherent detection is always desired ideally. Coherent detection assumes that the channel remains constant for at least two symbol periods. This can be realised mathematically by changing the upper limit of the integral in equation (7) from '$T_s + \tau_l$' to '$2T_s + \tau_l$'. Therefore; only the term '$y_{kl}$' changes and varies proportionally the value decision metric. Hence, this small change of '$T_s$' to '$2T_s$' is the difference between the optimum/suboptimum receiver designs with non-coherent and coherent detection respectively.

Shaping Pulses

Using shaping pulses in the transmitter, the data signal which is transmitted can be shaped in a desired waveform which will Make it relatively easier for the receiver to filter the received signals effectively and extract the information included in it. The typical shaping pulses that are used are the square, sinusoidal and cosine. These three pulses are expressed mathematically, respectively, as follows:

$$g(t)|_r = \sqrt{\frac{2E_b}{T_b}} \quad (42)$$

$$g(t)|_s = \begin{cases} \frac{\sin(\pi\tau)}{2T}, & 0 \le t \le 2T \\ 0, & \text{otherwise} \end{cases} \quad (43)$$

$$g(t)|_c = \begin{cases} \frac{1}{2LT}\left[1 - \frac{\cos(2\pi\tau)}{LT}\right], & 0 \le t \le 2T \\ 0, & \text{otherwise} \end{cases} \quad (44)$$

where L=1, for full response and L>1 for partial response, result in smaller bandwidth efficiency, hence, greater bandwidth efficiency than the use of rectangular pulses.

Digital Modulation Schemes

Digital modulation techniques can be an important factor in the transmission of digital data in order to achieve the highest possible data transmission rates. The higher the order of the modulation, the higher the spectral efficiency i.e. the higher the number of bits per transmitted symbol. However, in high order modulation schemes the complexity, and hence, the cost increase dramatically. In addition, the information symbols are located very close to each other which results in inter symbol interference (ISO. This increases the error rate and raises the need for more sophisticated, complex and costly receiver designs. Therefore, the choice of the appropriate modulation scheme for each system is relative to the performance requirements of it. Six types of digital modulations, namely, M-PSK, M-QAM, ASK/PAM, FSK, MSK and OFDM can be expressed mathematically as follows:

M-PSK $$S_k(t)|_{M\text{-}PSK} = g(t)\cos\left[2\pi f_c t + \frac{2\pi}{M}(m-1)\right] \quad m = 1, 2, \ldots, M \quad (45)$$

where g(t) stands for the shaping pulse, $f_c$ is the carrier frequency, M is the number of symbol states

M-QAM $$S_k(t)|_{M\text{-}QAM} = \text{Re}[A_{mc} + jA_{ms}]g(t)e^{2\pi f_c t} = \quad (46)$$

$$= A_{mc}g(t)\cos(2\pi f_c t) - A_{ms}g(t)\sin(2\pi f_c t) \quad (47)$$

where $A_{mc}$ and $A_{ms}$ stand for the mapping amplitudes in the real and imaginary axis, respectively.

ASK/PAM $$S_k(t)|_{ASK/PAM} = \text{Re}[A_m g(t)e^{2\pi f_c t}] = \quad (48)$$

$$= A_m g(t)\cos(2\pi f_c t) \quad m = 1, 2, \ldots, M \quad (49)$$

MSK $$S_k(t)|_{MSK} = A_{mc}\cos\left(\frac{\pi t}{2}\right)\cos(2\pi f_c t) - A_{ms}\sin\left(\frac{\pi t}{2}\right)\sin(2\pi f_c t) \quad (50)$$

FSK $$S_k(t)|_{FSK} = g(t)\cos[(2\pi f_c t) + 2\pi m \Delta f t] \quad m = 1, 2, \ldots, M \quad (51)$$

OFDM $$S_k(t)|_{OFDM} = \frac{1}{2}\sum_{k=0}^{N-1} X_k e^{\frac{j2\pi kt}{T}} e^{j2\pi f_c t} \quad (52)$$

where $X_k$ is the $k^{th}$ transmitted symbol and T is the period of each OFDM symbol. 1/T stands for the subcarrier spacing and it is actually the factor that provides the orthogonality between the subcarriers consisted within each OFDM.

Thus in accordance with the invention the configuration design of the receiving apparatus can be achieved by referring to the appropriate decision metric. As indicated above and in FIGS. 1-4, four basic receiver designs are produced directly from the four different derived decision metrics in equations (20), (24), (37), (40).

However, where non-coherent detection is provided in these designs, four modified designs can be produced for the cases of coherent detection.

In addition, the PDP was considered uniform in the four initial designs. Hence receiver designs with coherent and non-coherent detection under exponential PDP can be produced in a straightforward manner. In addition, each of the designs can be changed to take into account the six modulation schemes, and different shaping pulses can be used in all schemes except MSK and OFDM. Therefore, the number of receiver configuration designs which can be achieved are:

4(Initial) * 4(modulations) * 2(PDP) * 2(detections) * 3(pulses)[ = 192] +

4(Initial) * 2(modulations) * 2(PDP) * 2(detections) [ = 32] =

112(optimum) + 112(suboptimum) = 224 receiver designs

It will be appreciated by persons skilled in the art that the present invention may also include further additional modifications made to the device which does not affect the overall functioning of the device.

SEQUENCE LISTING

Not Applicable

The invention claimed is:

1. A broadcast receiver with improved response to long and short term fading which comprises:
a processor configured to receive a data signal which is assessed with respect to a decision metric derived upon utilising the probability density function of a Suzuki distribution in a closed form:

$$p_{a_l}(a_l) = \left(\frac{5}{2}\right)^{\frac{1}{8\sigma^2}} \frac{a_l e^{-\frac{\mu^2}{2\sigma^2}}}{\sigma\sqrt{2\pi}} \Gamma\left(1 - \frac{1}{8\sigma^2} - \frac{\mu}{2\sigma^2}\right)\left(-\frac{1}{8\sigma^2} - \frac{a_l^2}{2}\right)^{-1+\frac{1}{8\sigma^2}+\frac{\mu}{2\sigma^2}}$$

where σ and μ denote the variance and mean value respectively of the Lognormal distribution, in order to take into account potential impairment of the said data signal.

2. A broadcast receiver according to claim 1 wherein the receiver is optimised in a plurality of conditions with respect to the geographical location to which the receiver is to be used.

3. A broadcast receiver according to claim 1 wherein the data signal impairment is with respect to the fading of the data signal channel.

4. A broadcast receiver according to claim 1 wherein when the amplitudes of the data signal are independent with first order probability density functions $\{p\alpha_l(a_l)\}_{l=1}^{L_p}$, and the phase and delay values are known, the decision metric derived from the Suzuki distribution is:

$$\Lambda_k = \ln\left[p(\{r_l(t)\}_{l=1}^{L_p} | s_k(t), \{\theta_l\}_{l=1}^{L_p}, \{\tau_l\}_{l=1}^{L_p})\right].$$

5. A broadcast receiver according to claim 1 wherein the decision metric used when the phase value of the data signal is known but the amplitudes and delay values are not known is:

$$\Lambda_k = \ln\left[p(\{r_l(t)\}_{l=1}^{L_p} | s_k(t), \{\theta_l\}_{l=1}^{L_p})\right] =$$

$$\ln\left(K(B-A)\prod_{l=1}^{L_p}\left(\frac{5}{2}\right)^{\frac{1}{8\sigma^2}} \frac{e^{-\frac{\mu^2}{2\sigma^2}}}{2\sigma\sqrt{2\pi}} \Gamma\left(1 - \frac{1}{8\sigma^2} - \frac{\mu}{2\sigma^2}\right)\right.$$
$$\left[\frac{N_l}{E_k}\right]^{-1+\frac{1+4\mu}{4\sigma^2}} \Gamma\left(\frac{1+4\mu}{8\sigma^2} - \frac{1}{2}\right){}_1F_1\left(\frac{1+4\mu}{8\sigma^2} - \frac{1}{2}, \frac{1}{2}, \frac{e^{-j2\theta_l}y_{kl}^2(\tau)}{4E_k N_l}\right) +$$
$$\left.\left[\frac{e^{-j\theta_l}y_{kl}(\tau)}{N_l}\right]\sqrt{\frac{N_l}{E_k}} \Gamma\left(\frac{1+4\mu}{8\sigma^2}\right){}_1F_1\left(\frac{1+4\mu}{8\sigma^2}, \frac{3}{2}, \frac{e^{-j2\theta_l}y_{kl}^2(\tau)}{4E_k N_l}\right)\right)$$

and $$\Lambda_k = \ln\left[p(\{r_l(t)\}_{l=1}^{L_p} | s_k(t), \{\theta_l\}_{l=1}^{L_p})\right] =$$

$$\ln\left\{\begin{array}{l}K(B-A)\prod_{l=1}^{L_p}\left(\frac{5}{2}\right)^{\frac{1}{8\sigma^2}}\frac{e^{-\frac{\mu^2}{2\sigma^2}}}{2\sigma\sqrt{2\pi}}\Gamma\left(1-\frac{1}{8\sigma^2}-\frac{\mu}{2\sigma^2}\right)\left[\frac{N_l}{E_k}\right]^{-1+\frac{1+4\mu}{4\sigma^2}}\\ \Gamma\left(\frac{1+4\mu}{8\sigma^2}-\frac{1}{2}\right)*2^{1-\frac{1}{8\sigma^2}-\frac{\mu}{2\sigma^2}}{}_1F_1\left(\frac{1+4\mu}{8\sigma^2}-\frac{1}{2},\frac{1}{2},\frac{e^{-j2\theta_l}y_{kl}^2(\tau)}{4E_kN_l}\right)+\\ \left[\frac{e^{-j\theta_l}y_{kl}(\tau)}{N_l}\right]\sqrt{\frac{N_l}{E_k}}\Gamma\left(\frac{1+4\mu}{8\sigma^2}\right){}_1F_1\left(\frac{1+4\mu}{8\sigma^2},\frac{3}{2},\frac{e^{-j2\theta_l}y_{kl}^2(\tau)}{4E_kN_l}\right)\end{array}\right\}.$$

6. A broadcast receiver according to claim 1 wherein the decision metric used in the case of known delay and amplitude values of the data signal but the phase value is unknown is:

$$\Lambda_k = \ln\left[p\left(\{r_l(t)\}_{l=1}^{L_p}\mid s_k(t),\{\alpha_l\}_{l=1}^{L_p},\{\tau_l\}_{l=1}^{L_p}\right)\right]$$
$$= K\sum_{l=1}^{L_p}\ln\left[e^{-\frac{a_l^2 E_k}{N_l}}I_o\left(\frac{a_l}{N_l}|y_{kl}(\tau_l)|\right)\right].$$

7. A broadcast receiver according to claim 1 wherein the decision metric used in the case of a known delay value in the data signal but unknown amplitude and phase values is:

$$\Lambda_k=\ln\left[p(\{r_l(t)\}_{l=1}^{L_p}|s_k(t),\{\tau_l\}_{l=1}^{L_p})\right].$$

8. A broadcast receiver according to claim 1 wherein the decision metric used in the case when the delay, amplitude and phase values are unknown is:

$$\Lambda_k = \ln\left[p\left(\{r_l(t)\}_{l=1}^{L_p}\mid s_k(t)\right)\right] =$$
$$\ln\left[K(B-A)\prod_{l=1}^{L_p}\left(\frac{5}{2}\right)^{\frac{1}{8\sigma^2}}\frac{e^{-\frac{\mu^2}{2\sigma^2}}}{\sigma\sqrt{2\pi}}\Gamma\left(1-\frac{1}{8\sigma^2}-\frac{\mu}{2\sigma^2}\right)\right]$$
$$\frac{1}{2}\left[\frac{E_k}{N_l}\right]^{-\frac{1+4\mu}{8\sigma^2}}\Gamma\left(\frac{1+4\mu}{8\sigma^2}\right)$$

and $$\ln\left[\begin{array}{l}K(B-A)\prod_{l=1}^{L_p}\left(\frac{5}{2}\right)^{\frac{1}{8\sigma^2}}\frac{e^{-\frac{\mu^2}{2\sigma^2}}}{4\sigma\pi\sqrt{2}}\Gamma\left(1-\frac{1}{8\sigma^2}-\frac{\mu}{2\sigma^2}\right)\\ \left[\frac{E_k}{N_l}\right]^{\frac{1}{4}-\frac{1+4\mu}{8\sigma^2}}2^{\frac{1}{2}-\frac{1}{8\sigma^2}-\frac{\mu}{2\sigma^2}}\sqrt{\frac{|y_{kl}(\tau_l)|}{N_l}}\\ \left(\begin{array}{l}\Gamma\left(\frac{1+4\mu}{8\sigma^2}-\frac{1}{4}\right){}_1F_1\left(\frac{1+4\mu}{8\sigma^2}-\frac{1}{4},\frac{1}{2},\frac{y_{kl}^2(\tau)}{4E_kN_l}\right)-\\ \left[\frac{y_{kl}(\tau)}{\sqrt{E_kN_l}}\right]\Gamma\left(\frac{1+4\mu}{8\sigma^2}+\frac{1}{4}\right){}_1F_1\left(\frac{1+4\mu}{8\sigma^2}+\frac{1}{4},\frac{3}{2},\frac{y_{kl}^2(\tau)}{4E_kN_l}\right)\end{array}\right)\end{array}\right].$$

9. A broadcast data receiver according to claim 1 wherein the configuration of the receiver includes details relating to coherent detection as well as non-coherent detection.

10. A broadcast receiver according to claim 1 wherein the configuration of the receiver includes details of possible modulation schemes to be used.

11. A broadcast receiver according to claim 1 wherein the receiver is configured to receive data signals which are provided using shaping pulses.

12. A method of configuring receiving and/or processing apparatus for at least one data signal received from a remote transmitting location, said method comprising the steps of:
  identifying a data signal to be received; and
  configuring a receiving and/or processing apparatus based on said identified signal with reference to a decision metric derived upon utilising the probability density function of a Suzuki distribution in a closed form:

$$p_{a_l}(a_l) = \left(\frac{5}{2}\right)^{\frac{1}{8\sigma^2}}\frac{a_l e^{-\frac{\mu^2}{2\sigma^2}}}{\sigma\sqrt{2\pi}}\Gamma\left(1-\frac{1}{8\sigma^2}-\frac{\mu}{2\sigma^2}\right)\left(-\frac{1}{8\sigma^2}-\frac{a_l^2}{2}\right)^{-1+\frac{1}{8\sigma^2}+\frac{\mu}{2\sigma^2}}$$

where $\sigma$ and $\mu$ denote the variance and mean value respectively of the Lognormal distribution, in order to take into account potential impairment of the said data signal.

13. A method according to claim 12 wherein the method includes the step of identifying the geographical location at which the said apparatus is to be used.

* * * * *